United States Patent
Oshimo et al.

(10) Patent No.: US 9,873,775 B2
(45) Date of Patent: Jan. 23, 2018

(54) RUBBER COMPOSITION AND PNEUMATIC TIRE FORMED FROM SAID RUBBER COMPOSITION

(71) Applicant: SUMITOMO RUBBER INDUSTRIES, LTD., Kobe-shi, Hyogo (JP)

(72) Inventors: Masaki Oshimo, Kobe (JP); Kenya Watanabe, Kobe (JP); Toshifumi Haba, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/297,435

(22) Filed: Oct. 19, 2016

(65) Prior Publication Data

US 2017/0137599 A1 May 18, 2017

(30) Foreign Application Priority Data

Nov. 12, 2015 (JP) .................. 2015-222194

(51) Int. Cl.
| | |
|---|---|
| C08L 31/00 | (2006.01) |
| C08K 3/36 | (2006.01) |
| C08K 3/04 | (2006.01) |
| B60C 1/00 | (2006.01) |
| C08F 236/10 | (2006.01) |
| C08F 236/22 | (2006.01) |
| C08L 9/00 | (2006.01) |
| C08L 9/06 | (2006.01) |
| C08L 15/00 | (2006.01) |
| C08L 47/00 | (2006.01) |

(52) U.S. Cl.
CPC ............... *C08K 3/36* (2013.01); *B60C 1/00* (2013.01); *B60C 1/0016* (2013.01); *C08F 236/10* (2013.01); *C08F 236/22* (2013.01); *C08K 3/04* (2013.01); *C08L 9/00* (2013.01); *C08L 9/06* (2013.01); *C08L 15/00* (2013.01); *C08L 47/00* (2013.01)

(58) Field of Classification Search
CPC .................... C08K 3/36; C08K 3/04

USPC .......................................................... 524/559
See application file for complete search history.

(56) References Cited

U.S. PATENT DOCUMENTS

| | | | | |
|---|---|---|---|---|
| 2002/0156169 A1* | 10/2002 | Kondo | .................. | C08G 18/12 524/425 |
| 2015/0087763 A1* | 3/2015 | Koda | ....................... | B60C 1/00 524/493 |

FOREIGN PATENT DOCUMENTS

| | | | |
|---|---|---|---|
| CN | 4945817 | * | 9/2015 |
| JP | 2013-53296 A | | 3/2013 |

OTHER PUBLICATIONS

Translation of CN104945817, Sep. 30, 2015.*

* cited by examiner

*Primary Examiner* — Hui Chin
(74) *Attorney, Agent, or Firm* — Birch, Stewart, Kolasch & Birch, LLP

(57) ABSTRACT

Provided are a rubber composition that shows a balanced improvement in fuel economy and abrasion resistance while having good processability, and a pneumatic tire formed from the rubber composition. The present invention relates to a rubber composition containing: a rubber component including a copolymer containing a structural unit derived from a conjugated diene monomer, a structural unit derived from farnesene, and a structural unit derived from a compound represented by the formula (1) below; and carbon black and/or silica, (1)

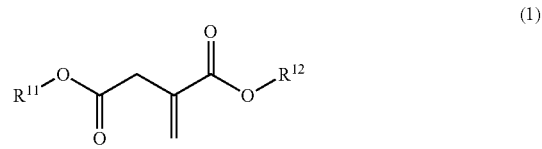

wherein $R^{11}$ and $R^{12}$ are the same as or different from each other and each represent a hydrogen atom or a C1-C30 hydrocarbon group.

6 Claims, No Drawings

RUBBER COMPOSITION AND PNEUMATIC TIRE FORMED FROM SAID RUBBER COMPOSITION

TECHNICAL FIELD

The present invention relates to a rubber composition and a pneumatic tire formed from the rubber composition.

BACKGROUND ART

Tire treads are required to have high-level properties, such as mainly high fuel economy and high abrasion resistance. Various techniques for improving these properties have been examined.

For example, fuel economy is known to be improved by introducing a functional group having an affinity for filler into the polymer chain end, while abrasion resistance is known to be improved by using a high molecular weight polymer having a molecular weight of 250,000 or more.

However, the introduction of a functional group having an affinity for filler and the use of a high molecular weight polymer unfortunately lead to an increase in the hardness of rubber compositions and deterioration of the processability.

Patent Literature 1 discloses a tire rubber composition having fuel economy and abrasion resistance that are improved by incorporation of a liquid resin having a softening point of −20° C. to 45° C. and a specific silica. However, there is still room for improvement in achieving a balanced improvement in these properties while providing good processability.

CITATION LIST

Patent Literature

Patent Literature 1: JP 2013-053296 A

SUMMARY OF INVENTION

Technical Problem

The present invention aims to solve the above problem and provide a rubber composition that shows a balanced improvement in fuel economy and abrasion resistance while having good processability, and a pneumatic tire formed from the rubber composition.

Solution to Problem

The present invention relates to a rubber composition, containing: a rubber component including a copolymer containing a structural unit derived from a conjugated diene monomer, a structural unit derived from farnesene, and a structural unit derived from a compound represented by the formula (1) below; and at least one of carbon black or silica,

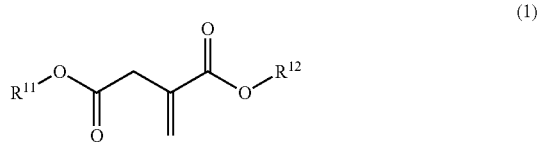

(1)

wherein $R^{11}$ and $R^{12}$ are the same as or different from each other and each represent a hydrogen atom or a C1-C30 hydrocarbon group.

The copolymer preferably contains, per 100% by mass of structural units of the copolymer, 10% to 50% by mass of the structural unit derived from a conjugated diene monomer, 20% to 60% by mass of the structural unit derived from farnesene, and 10% to 30% by mass of the structural unit derived from a compound of formula (1).

The copolymer preferably has a weight average molecular weight of 5,000 to 2,000,000 and a molecular weight distribution of 2.1 to 11.

$R^{11}$ and $R^{12}$ are preferably ethyl groups.

The conjugated diene monomer is preferably 1,3-butadiene.

Preferably, the copolymer further contains a structural unit derived from a compound represented by the formula (2) below in an amount of 1% to 20% by mass per 100% by mass of structural units of the copolymer,

(2)

wherein $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

The rubber composition is preferably a rubber composition for tires.

The present invention also relates to a pneumatic tire, formed from the rubber composition.

Advantageous Effects of Invention

The rubber composition of the present invention contains a rubber component including a copolymer containing a structural unit derived from a conjugated diene monomer, a structural unit derived from farnesene, and a structural unit derived from a compound represented by the above formula (1); and carbon black and/or silica. Such a rubber composition achieves a balanced improvement in fuel economy and abrasion resistance while having good processability.

DESCRIPTION OF EMBODIMENTS

The rubber composition of the present invention contains a rubber component including a copolymer containing a structural unit derived from a conjugated diene monomer, a structural unit derived from farnesene, and a structural unit derived from a compound represented by the above formula (1); and carbon black and/or silica. The use of carbon black and/or silica with a copolymer that contains a structural unit derived from a conjugated diene monomer and further contains a structural unit derived from farnesene and a structural unit derived from a compound of formula (1) enables production of a rubber composition that has good processability before vulcanization and further shows a balanced improvement in fuel economy and abrasion resistance. Thus, a rubber composition that is excellent in the balance of these properties can be provided. Particularly, rather than a copolymer containing structural units derived from a conjugated diene monomer and a compound of formula (1), the use of a copolymer further containing a structural unit derived from farnesene which has an affinity for filler leads to a synergistic improvement in fuel economy and abrasion resistance due to the synergistic effect of the structural unit derived from a compound of formula (1) and the structural unit derived from farnesene, and therefore a balanced improvement in both properties.

The copolymer contains a structural unit derived from a conjugated diene monomer. Examples of the conjugated diene monomer include 1,3-butadiene, isoprene, and 2,3-dimethyl-1,3-butadiene. In view of fuel economy, abrasion resistance, and wet grip performance, preferred among these is 1,3-butadiene or isoprene, with 1,3-butadiene being more preferred. Each of these monomers may be used alone, or two or more of these may be used in combination.

In the copolymer, the amount of the structural unit derived from a conjugated diene monomer per 100% by mass of the structural units of the copolymer is preferably 10% by mass or more, more preferably 20% by mass or more, still more preferably 30% by mass or more, particularly preferably 40% by mass or more. The amount is also preferably 50% by mass or less. If the amount is less than 10% by mass, abrasion resistance may be reduced. If the amount is more than 50% by mass, fuel economy may be reduced.

The copolymer contains a structural unit derived from farnesene. Farnesene exists in isomer forms, including α-farnesene ((3E,7E)-3,7,11-trimethyl-1,3,6,10-dodecatetraene) and β-farnesene (7,11-dimethyl-3-methylene-1,6,10-dodecatriene). Preferred is (E)-β-farnesene having the following structure.

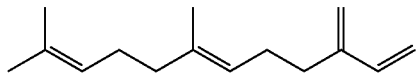

The farnesene may be produced by chemical synthesis from petroleum resources, or may be extracted from insects such as aphids or plants such as apples. Preferably, it is produced by culturing a microorganism using a carbon source derived from a saccharide. The copolymer can be efficiently produced from such farnesene.

The saccharide used may be any of monosaccharides, disaccharides, and polysaccharides, or a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

Saccharides suitable for producing farnesene are obtainable from a wide variety of materials, such as sugar cane, bagasse, *Miscanthus*, sugar beet, sorghum, grain sorghum, switchgrass, barley, hemp, kenaf, potato, sweet potato, cassava, sunflower, fruits, molasses, whey, skim milk, corn, straw, grain, wheat, wood, paper, wheat straw, and cotton. In addition, cellulosic wastes and other biomass materials may also be used. Among these, plants of genus *Saccharum*, such as sugar cane (*Saccharum officinarum*) are preferred, with sugar cane being more preferred.

The microorganism used may be any microorganism capable of producing farnesene by culture. Examples include eukaryotes, bacteria, and archaeabacteria. Examples of eukaryotes include yeast and plants.

The microorganism may be a transformant. The transformant can be obtained by introducing a foreign gene into a host microorganism. The foreign gene is not particularly limited, but is preferably a foreign gene involved in the production of farnesene because it can improve farnesene productivity.

The conditions for culture are not particularly limited as long as they allow the microorganism to produce farnesene. Any medium commonly used for culturing microorganisms may be used to culture the microorganism. Specific examples include, in the case of bacteria, KB medium and LB medium; in the case of yeast, YM medium, KY medium, F101 medium, YPD medium, and YPAD medium; and in the case of plants, basal media such as White medium, Heller medium, SH medium (Schenk and Hildebrandt medium), MS medium (Murashige and Skoog medium), LS medium (Linsmaier and Skoog medium), Gamborg medium, B5 medium, MB medium, and WP medium (for woody plants).

The culture temperature depends on the type of microorganism, but is preferably 0° C. to 50° C., more preferably 10° C. to 40° C., still more preferably 20° C. to 35° C. The pH is preferably 3 to 11, more preferably 4 to 10, still more preferably 5 to 9. The microorganism may be cultured either anaerobically or aerobically depending on its type.

The microorganism may be cultured in a batch culture, or in a continuous culture using a bioreactor. Specific examples of the culturing method include shaking culture and rotary culture. Farnesene may be accumulated in the cells of the microorganism, or may be produced and accumulated in the culture supernatant.

When farnesene is to be recovered from the cultured microorganism, the microorganism may be collected by centrifugation and disrupted, after which farnesene can be extracted from the homogenate with a solvent such as 1-butanol. Such solvent extraction may appropriately be combined with a known purification process such as chromatography. The microorganism is preferably disrupted at a low temperature, for example at 4° C., in order to prevent modification and breakdown of farnesene. The microorganism may be disrupted physically, e.g., using glass beads, for example.

When farnesene is to be recovered from the culture supernatant, the culture may be centrifuged to remove the cells, after which farnesene can be extracted from the resulting supernatant with a solvent such as 1-butanol.

In the copolymer, the amount of the structural unit derived from farnesene per 100% by mass of the structural units of the copolymer is preferably 20% by mass or more. The amount is also preferably 60% by mass or less, more preferably 50% by mass or less, still more preferably 40% by mass or less, particularly preferably 30% by mass or less. If the amount is less than 20% by mass, abrasion resistance may be reduced. If the amount is more than 60% by mass, fuel economy may be reduced.

The copolymer contains a structural unit derived from a compound represented by the following formula (1):

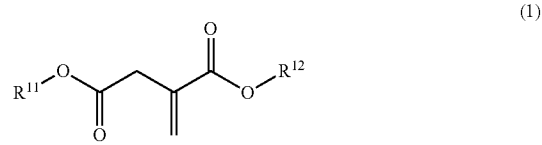

(1)

wherein $R^{11}$ and $R^{12}$ are the same as or different from each other and each represent a hydrogen atom or a C1-C30 hydrocarbon group.

The hydrocarbon group for $R^{11}$ and $R^{12}$ may be a linear, branched, or cyclic group, and examples include aliphatic hydrocarbon groups, alicyclic hydrocarbons groups, and aromatic hydrocarbon groups. Preferred among these are aliphatic hydrocarbon groups. The number of carbon atoms in the hydrocarbon group is preferably 1 to 20, more preferably 1 to 10.

The aliphatic hydrocarbon group for $R^{11}$ and $R^{12}$ is preferably a C1-C20, more preferably C1-C10 group. Preferred examples include alkyl groups, specifically such as methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these is a methyl or ethyl group, with an ethyl group being more preferred, because they contribute to significantly improving the balance of fuel economy, abrasion resistance, and wet grip performance while providing good processability.

The alicyclic hydrocarbon group is preferably a C3-C8 group, and specific examples include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

The aromatic hydrocarbon group is preferably a C6-C10 group, and specific examples include phenyl, benzyl, phenethyl, tolyl, xylyl, and naphthyl groups. The tolyl or xylyl group may have a methyl substituent(s) at any position, ortho, meta, or para, on the benzene ring.

Specific examples of the compound of formula (1) include itaconic acid, 1-methyl itaconate, 4-methyl itaconate, dimethyl itaconate, 1-ethyl itaconate, 4-ethyl itaconate, diethyl itaconate, 1-propyl itaconate, 4-propyl itaconate, dipropyl itaconate, 1-butyl itaconate, 4-butyl itaconate, dibutyl itaconate, and 1-ethyl-4-methyl itaconate. Among these, diethyl itaconate, dibutyl itaconate, and 1-propyl itaconate are preferred, with diethyl itaconate being more preferred, because they contribute to significantly improving the balance of fuel economy, abrasion resistance, and wet grip performance while providing good processability. Each of these compounds may be used alone, or two or more of these may be used in combination.

In the copolymer, the amount of the structural unit derived from a compound of formula (1) per 100% by mass of the structural units of the copolymer is preferably 10% by mass or more. The amount is also preferably 30% by mass or less. If the amount is less than 10% by mass, fuel economy may be reduced. If the amount is more than 30% by mass, abrasion resistance may be reduced.

The copolymer preferably contains a structural unit derived from a compound represented by the formula (2) below. When the copolymer contains a structural unit derived from a compound of formula (2), preferably styrene, in addition to the structural unit derived from a conjugated diene monomer, the structural unit derived from farnesene, and the structural unit derived from a compound of formula (1), abrasion resistance can be more significantly improved, and the balance of fuel economy and abrasion resistance can be more significantly improved while achieving good processability.

(2)

In formula (2), $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

Examples of the C1-C3 aliphatic hydrocarbon group in the compound of formula (2) include C1-C3 alkyl groups such as methyl, ethyl, n-propyl, and isopropyl groups. Preferred among these is a methyl group.

Examples of the C3-C8 alicyclic hydrocarbon group in the compound of formula (2) include those as described for the compound of formula (1).

Examples of the C6-C10 aromatic hydrocarbon group in the compound of formula (2) include those as described for the compound of formula (1). Phenyl, tolyl, and naphthyl groups are preferred, with a phenyl group being more preferred, because of their high reactivity.

$R^{21}$ is preferably a C6-C10 aromatic hydrocarbon group. $R^{22}$ is preferably a hydrogen atom.

Examples of the compound of formula (2) include styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene. Among these, styrene, α-methylstyrene, α-vinylnaphthalene, and β-vinylnaphthalene are preferred, with styrene being more preferred, because of their high reactivity.

In the copolymer, the amount of the structural unit derived from a compound of formula (2) per 100% by mass of the structural units of the copolymer is preferably 1% by mass or more, more preferably 5% by mass or more, still more preferably 10% by mass or more. The amount is also preferably 20% by mass or less. When the amount falls within the range indicated above, the effects of the present invention can be sufficiently achieved.

In the copolymer, the amounts of the structural unit derived from a conjugated diene monomer, the structural unit derived from farnesene, the structural units derived from a compound of formula (1) or (2), and other structural units can be measured by NMR (from Bruker).

The copolymer may be produced by any copolymerization method, such as solution polymerization, emulsion polymerization, gas phase polymerization, or bulk polymerization. Emulsion polymerization is preferred because this method allows for high-yield production of copolymers with a high degree of monomer randomness.

In the case of emulsion polymerization, the copolymer can be synthesized by known emulsion polymerization methods. For example, the copolymer may be more suitably produced by a method including the steps of: emulsifying the monomers of the copolymer, i.e. the conjugated diene monomer, farnesene, and the compound of formula (1), and optionally the compound of formula (2), in water using an emulsifier; and adding a free radical initiator to the resulting emulsion to cause free radical polymerization.

The emulsion can be prepared by known emulsification methods using emulsifiers. Any emulsifier may be used including known materials, such as fatty acid salts and rosin acid salts. Examples of fatty acid salts and rosin acid salts include potassium or sodium salts of capric acid, lauric acid, and myristic acid.

The emulsion polymerization can be carried out by known methods using free radical polymerization initiators. Any free radical polymerization initiator may be used including known materials, such as redox initiators e.g. paramenthane hydroperoxide, and persulfates e.g. ammonium persulfate.

The temperature of emulsion polymerization may be selected appropriately according to the type of free radical initiator used, and it preferably ranges from −30° C. to 50° C., more preferably from −10° C. to 20° C.

The emulsion polymerization can be stopped by adding a polymerization terminator to the polymerization system. Any polymerization terminator may be used including known materials, such as N,N'-dimethyldithiocarbamate, diethylhydroxylamine, and hydroquinone.

The copolymer in the present invention is preferably produced by emulsion polymerization in the presence of a chain transfer agent. The thus produced copolymer further improves processability, fuel economy, and abrasion resistance.

The chain transfer agent refers to a free radical polymerization controlling agent that can act on the growing polymer chain end to terminate the polymer growth while generating a new polymerization-initiating radical. This agent enables control of the molecular weight and molecular weight distribution of the polymer (decrease in molecular weight and narrowing of molecular weight distribution), control of the polymer chain end structure, and the like.

Examples of the chain transfer agent include n-octyl mercaptan, n-nonyl mercaptan, n-decyl mercaptan, n-dodecyl mercaptan, t-dodecyl mercaptan, and n-hexadecyl mercaptan, with t-dodecyl mercaptan being preferred as it can readily control the molecular weight.

The chain transfer agent may also suitably be a compound that contains a functional group having an affinity for filler, and a mercapto group. When the compound that contains a mercapto group and, further, a functional group having an affinity for filler is used as the chain transfer agent, the functional group having an affinity for filler can be introduced into the polymer chain end, thereby more significantly improving fuel economy and abrasion resistance. Examples of the functional group having an affinity for filler include amino, amide, alkoxysilyl, isocyanate, imino, imidazole, urea, ester, ether, carbonyl, carboxyl, hydroxyl, nitrile, and pyridyl groups. Preferred among these are alkoxysilyl and ester groups, with alkoxysilyl groups being more preferred. The term "filler" herein refers to reinforcing filler such as carbon black or silica.

Examples of the compound containing an alkoxysilyl group and a mercapto group include 3-mercaptopropyltrimethoxysilane, 3-mercaptopropyltriethoxysilane, 2-mercaptoethyltrimethoxysilane, 2-mercaptoethyltriethoxysilane, and a compound (Si363 available from EVONIK-DEGUSSA) represented by the formula below. In order to better achieve the effects of the present invention, 3-mercaptopropyltriethoxysilane or the compound of the formula below may suitably be used, with the compound of the formula below being more preferred. Each of these compounds may be used alone, or two or more of these may be used in combination.

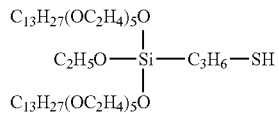

The weight average molecular weight (Mw) of the copolymer is preferably 5,000 or more, more preferably 50,000 or more, still more preferably 100,000 or more, particularly preferably 300,000 or more, most preferably 450,000 or more. The weight average molecular weight is also preferably 2,000,000 or less, more preferably 1,500,000 or less, still more preferably 1,000,000 or less. If the Mw is less than 5,000, fuel economy and abrasion resistance may deteriorate. If the Mw is more than 2,000,000, processability may deteriorate.

The ratio of the Mw to the number average molecular weight (Mn) of the copolymer, that is, the molecular weight distribution (Mw/Mn), is preferably 2.1 or more, more preferably 2.5 or more, still more preferably 3.8 or more. The molecular weight distribution is also preferably 11 or less, more preferably 8.0 or less, still more preferably 5.0 or less. If the Mw/Mn is less than 2.1, processability may deteriorate. If the Mw/Mn is more than 11, fuel economy may deteriorate.

The Mw and Mn values are determined relative to polystyrene standards using a gel permeation chromatograph (GPC).

The copolymer preferably has a glass transition temperature (Tg) of −100° C. to 100° C., more preferably −70° C. to 0° C. When the Tg falls within the range indicated above, the effects of the present invention can be sufficiently achieved.

The Tg values are measured with a differential scanning calorimeter (Q200, available from TA Instruments, Japan) at a temperature increase rate of 10° C./min in accordance with JIS K 7121:1987.

The copolymer preferably has a Mooney viscosity, $ML_{1+4}$, at 130° C. of 30 to 100, more preferably 40 to 80. When the $ML_{1+4}$ falls within the range indicated above, the effects of the present invention can be sufficiently achieved.

The Mooney viscosity ($ML_{1+4}$, 130° C.) values are determined by measuring Mooney viscosity at 130° C. in accordance with JIS K 6300.

The amount of the copolymer per 100% by mass of the rubber component is preferably 1% by mass or more, more preferably 50% by mass or more, still more preferably 70% by mass or more, particularly preferably 80% by mass or more, and may be 100% by mass. Less than 1% by mass of the copolymer may be too small to achieve the effects of the present invention.

Examples of other rubber materials that can be used together with the copolymer as the rubber component in the present invention include diene rubbers such as natural rubber (NR), polyisoprene rubber (IR), polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR). Each of these diene rubbers may be used alone, or two or more of these may be used in combination.

The rubber composition of the present invention contains carbon black and/or silica as filler.

The carbon black may be one commonly used in tire production, and examples include SAF, ISAF, HAF, FF, FEF, and GPF. Each of these carbon blacks may be used alone, or two or more of these may be used in combination.

The carbon black preferably has a nitrogen adsorption specific surface area ($N_2SA$) of 80 m$^2$/g or more, more preferably 100 m$^2$/g or more. The $N_2SA$ is also preferably 200 m$^2$/g or less, more preferably 150 m$^2$/g or less. Carbon black having a $N_2SA$ of less than 80 m$^2$/g tends to provide low reinforcing properties and thus fail to sufficiently improve abrasion resistance. Carbon black having a $N_2SA$ of more than 200 m$^2$/g tends to disperse poorly, resulting in deterioration of fuel economy.

The $N_2SA$ of carbon black can be measured in accordance with JIS K 6217-2:2001.

The carbon black preferably has a dibutyl phthalate oil absorption (DBP) of 50 mL/100 g or more, more preferably 100 mL/100 g or more. The DBP is also preferably 200 mL/100 g or less, more preferably 150 mL/100 g or less. Carbon black having a DBP of less than 50 mL/100 g may fail to provide sufficient reinforcing properties, thereby resulting in a decrease in abrasion resistance. Carbon black having a DBP of more than 200 mL/100 g may have reduced dispersibility, resulting in deterioration of fuel economy.

The DBP of carbon black can be measured in accordance with JIS K 6217-4:2001.

The amount of carbon black per 100 parts by mass of the rubber component is preferably 1 part by mass or more, more preferably 3 parts by mass or more. The amount is also preferably 50 parts by mass or less, more preferably 30 parts by mass or less, still more preferably 20 parts by mass or less. If the amount is less than 1 part by mass, abrasion resistance may deteriorate. If the amount is more than 50 parts by mass, fuel economy may deteriorate.

Non-limiting examples of the silica include dry silica (anhydrous silicic acid) and wet silica (hydrous silicic acid). Wet silica is preferred because it has a large number of silanol groups.

The silica preferably has a $N_2SA$ of 100 $m^2/g$ or more, more preferably 150 $m^2/g$ or more. The $N_2SA$ is also preferably 300 $m^2/g$ or less, more preferably 200 $m^2/g$ or less. Silica having a $N_2SA$ of less than 100 $m^2/g$ tends to produce a small reinforcing effect and thus fail to sufficiently improve abrasion resistance. Silica having a $N_2SA$ of more than 300 $m^2/g$ tends to disperse poorly, resulting in deterioration of fuel economy.

The $N_2SA$ of silica can be measured in accordance with ASTM D3037-81.

The amount of silica per 100 parts by mass of the rubber component is preferably 1 part by mass or more, more preferably 10 parts by mass or more, still more preferably 30 parts by mass or more, particularly preferably 50 parts by mass or more. The amount is also preferably 150 parts by mass or less, more preferably 100 parts by mass or less. If the amount is less than 1 part by mass, sufficient fuel economy and sufficient abrasion resistance tend not to be obtained. If the amount is more than 150 parts by mass, the dispersibility of silica tends to deteriorate, resulting in deterioration of processability.

The rubber composition of the present invention preferably contains a silane coupling agent together with silica.

The silane coupling agent may be any silane coupling agent conventionally used in combination with silica in the rubber industry. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred.

When a silane coupling agent is contained, the amount of silane coupling agent per 100 parts by mass of silica is preferably 1 part by mass or more, more preferably 2 parts by mass or more. The amount is also preferably 20 parts by mass or less, more preferably 15 parts by mass or less. If the amount is less than 1 part by mass, an improvement in dispersibility and other effects tend not to be sufficiently achieved. If the amount is more than 20 parts by mass, the coupling effect tends to be insufficient, thereby resulting in reduced reinforcing properties.

The rubber composition of the present invention preferably contains oil. When oil is incorporated into the rubber compound containing the copolymer, the effects of the present invention can be better achieved.

Examples of usable oil include paraffinic oil, aromatic oil, and naphthenic oil. Each of these oils may be used alone, or two or more of these may be used in combination. Among these, paraffinic oil is preferred because the effects of the present invention can be better achieved.

When oil is contained, the amount of oil per 100 parts by mass of the rubber component is preferably 5 parts by mass or more, more preferably 10 parts by mass or more, still more preferably 20 parts by mass or more, particularly preferably 30 parts by mass or more. The amount is also preferably 50 parts by mass or less, more preferably 40 parts by mass or less. When the amount falls within the range indicated above, the effects of the present invention can be better achieved.

The rubber composition of the present invention may optionally incorporate compounding agents conventionally used in the rubber industry, in addition to the components described above. Examples include other reinforcing fillers, antioxidants, waxes, vulcanizing agents such as sulfur, and vulcanization accelerators.

The rubber composition of the present invention can be used in treads (cap treads, base treads), sidewalls, and other components of tires, and is particularly suitable for treads, especially cap treads.

The pneumatic tire of the present invention can be produced from the above-described rubber composition by usual methods.

Specifically, the rubber composition incorporating the components described above, before vulcanization, is extruded and processed into the shape of a tire component, e.g. a tread and assembled with other tire components on a tire building machine in a usual manner to build an unvulcanized tire. The unvulcanized tire is heated and pressurized in a vulcanizer to produce a tire.

The pneumatic tire of the present invention is suitable for passenger vehicles, large passenger vehicles, large SUVs, heavy load vehicles such as trucks and buses, and light trucks, and usable as a winter tire or studless winter tire in these vehicles.

EXAMPLES

The present invention is specifically described with reference to examples but is not limited only thereto.

The chemicals used in production examples are listed below.

Ion-exchanged water: In-house product

Potassium rosinate soap: available from Harima Chemicals Group, Inc.

Fatty acid sodium soap: available from Wako Pure Chemical Industries, Ltd.

Potassium chloride: available from Wako Pure Chemical Industries, Ltd.

Sodium naphthalene sulfonate-formaldehyde condensate: available from Kao Corporation Styrene: Styrene available from Wako Pure Chemical Industries, Ltd.

1,3-Butadiene: 1,3-Butadiene available from Takachiho Trading Co., Ltd.

t-Dodecyl mercaptan: tert-Dodecyl mercaptan available from Wako Pure Chemical Industries, Ltd. (chain transfer agent)

Sodium hydrosulfide: Product of Wako Pure Chemical Industries, Ltd.

$FeSO_4$: Ferric sulfate available from Wako Pure Chemical Industries, Ltd.

EDTA: Sodium ethylenediaminetetraacetate available from Wako Pure Chemical Industries, Ltd.

Rongalite: Sodium formaldehyde sulfoxylate available from Wako Pure Chemical Industries, Ltd.

Polymerization initiator: Paramenthane hydroperoxide available from NOF Corporation Polymerization terminator: N,N-Diethylhydroxylamine available from Wako Pure Chemical Industries, Ltd.

2,6-Di-t-butyl-p-cresol: Sumilizer BHT available from Sumitomo Chemical Co., Ltd.

Diethyl itaconate (IDE): Product of Tokyo Chemical Industry Co., Ltd.

Farnesene: Product of Yasuhara Chemical Co., Ltd.

(Preparation of Emulsifier)

An emulsifier was prepared by adding 9,356 g of ion-exchanged water, 1,152 g of potassium rosinate soap, 331 g of fatty acid sodium soap, 51 g of potassium chloride, and 30 g of sodium naphthalene sulfonate-formaldehyde condensate, followed by stirring at 70° C. for 2 hours.

Production Example 1

A 50-L (interior volume) stainless steel polymerization reactor was cleaned, dried, and purged with dry nitrogen. Then, the reactor was charged with 3,000 g of 1,3-butadiene, 2,000 g of styrene, 5.74 g of t-dodecyl mercaptan, 9,688 g of the emulsifier, 6.3 mL of sodium hydrosulfide (1.8 M), 6.3 mL each of the activators ($FeSO_4$/EDTA/Rongalite), and 6.3 mL of the polymerization initiator (2.3 M), followed by polymerization at 10° C. for 3 hours with stirring. After the completion of the polymerization, 2.9 g of N,N-diethylhydroxylamine was added to the reaction mixture and they were reacted for 30 minutes. The contents were taken out from the polymerization reactor and combined with 10 g of 2,6-di-t-butyl-p-cresol. After most of the water was evaporated off, the residue was dried under reduced pressure at 55° C. for 12 hours to obtain a copolymer 1.

Production Example 2

A copolymer 2 was prepared as in Production Example 1, except that 2,500 g of 1,3-butadiene, 1,000 g of styrene, 1,000 g of farnesene, and 500 g of diethyl itaconate (IDE) were used instead of 3,000 g of 1,3-butadiene and 2,000 g of styrene.

Production Example 3

A copolymer 3 was prepared as in Production Example 1, except that 3,000 g of 1,3-butadiene, 1,000 g of styrene, and 1,000 g of farnesene were used instead of 3,000 g of 1,3-butadiene and 2,000 g of styrene.

Production Example 4

A copolymer 4 was prepared as in Production Example 1, except that 3,500 g of 1,3-butadiene, 1,000 g of styrene, and 500 g of diethyl itaconate (IDE) were used instead of 3,000 g of 1,3-butadiene and 2,000 g of styrene.

Production Example 5

A copolymer 5 was prepared as in Production Example 1, except that 4,000 g of 1,3-butadiene and 1,000 g of styrene were used instead of 3,000 g of 1,3-butadiene and 2,000 g of styrene.

Production Example 6

A copolymer 6 was prepared as in Production Example 1, except that 5,000 g of 1,3-butadiene was used instead of 3,000 g of 1,3-butadiene and 2,000 g of styrene.

Production Example 7

A copolymer 7 was prepared as in Production Example 1, except that 2,500 g of 1,3-butadiene, 1,000 g of farnesene, and 1,500 g of diethyl itaconate (IDE) were used instead of 3,000 g of 1,3-butadiene and 2,000 g of styrene.

Table 1 shows the amount of styrene (a compound of formula (2)), the amount of butadiene (a conjugated diene monomer), the amount of farnesene, the amount of diethyl itaconate (a compound of formula (1)), Mw, Mw/Mn, Tg, and Mooney viscosity of the copolymers 1 to 7 prepared in Production Examples 1 to 7. These values were determined as collectively described below.

(Amounts of Monomer Units)

A $^1$H-NMR spectrum was measured using an NMR spectrometer (available from Bruker) at 23° C. This spectrum was used to calculate the ratio of the peaks from the phenyl protons of the styrene unit at 6.5 to 7.2 ppm, the vinyl protons of the butadiene unit at 4.9 to 5.4 ppm, the 1,4-bond of the farnesene unit at 4.4 to 4.9 ppm, and the isobutyl vinyl ether unit at 3.9 to 4.2 ppm. Then, the amounts of the monomer units were determined from the ratio.

(Determination of Weight Average Molecular Weight (Mw) and Number Average Molecular Weight (Mn))

The weight average molecular weight (Mw) and number average molecular weight (Mn) of each copolymer were determined using a gel permeation chromatograph (GPC) (GPC-8000 series available from Tosoh Corporation, detector: differential refractometer, column: TSKGEL SUPERMULTIPORE HZ-M available from Tosoh Corporation) with polystyrene standards.

(Measurement of Glass Transition Temperature (Tg))

The glass transition temperature (Tg) was defined as the glass transition onset temperature measured using a differential scanning calorimeter (Q200, available from TA Instruments, Japan) at a temperature increase rate of 10° C./min in accordance with JIS K 7121.

(Mooney Viscosity ($ML_{1+4}$, 130° C.))

After preheating at 130° C. for 1 minute, each copolymer was measured for Mooney viscosity ($ML_{1+4}$, 130° C.) for 4 minutes using a Mooney viscometer (SMV-200, available from Shimadzu Corporation) in accordance with JIS K 6300.

TABLE 1

| | Copolymer | | | | | | |
|---|---|---|---|---|---|---|---|
| | 1 | 2 | 3 | 4 | 5 | 6 | 7 |
| Amount of styrene (compound of formula (2)) (% by mass) | 40 | 20 | 20 | 20 | 20 | 0 | 0 |
| Amount of butadiene (conjugated diene monomer) (% by mass) | 60 | 50 | 60 | 70 | 80 | 100 | 50 |
| Amount of farnesene (% by mass) | 0 | 20 | 20 | 0 | 0 | 0 | 20 |
| Amount of diethyl itaconate (compound of formula (1)) (% by mass) | 0 | 10 | 0 | 10 | 0 | 0 | 30 |
| Weight average molecular weight (Mw) | 470,000 | 460,000 | 490,000 | 490,000 | 470,000 | 480,000 | 470,000 |
| Molecular weight distribution (Mw/Mn) | 3.8 | 3.9 | 3.8 | 3.9 | 3.9 | 3.2 | 3.8 |
| Tg (° C.) | −38 | −40 | −37 | −30 | −28 | −107 | −30 |
| Mooney viscosity (ML$_{1+4}$, 130° C.) | 44 | 40 | 50 | 49 | 51 | 42 | 42 |

The chemicals used in examples and comparative examples were listed below.

Copolymers 1 to 7: Copolymers prepared in Production Examples 1 to 7

Silica: ULTRASIL VN3 (N$_2$SA: 175 m$^2$/g) available from Degussa

Carbon black: SHOBLACK N220 (N$_2$SA: 111 m$^2$/g, DBP: 115 mL/100 g) available from Cabot Japan K.K.

Oil: PW-380 (mineral oil) available from Idemitsu Kosan Co., Ltd.

Coupling agent: Si69 (bis(3-triethoxysilylpropyl)-tetrasulfide) available from Degussa Wax: Sunnoc Wax available from Ouchi Shinko Chemical Industrial Co., Ltd.

Antioxidant: NOCRAC 6C (N-1,3-dimethylbutyl-N'-phenyl-p-phenylenediamine) available from Ouchi Shinko Chemical Industrial Co., Ltd.

Zinc oxide: Zinc oxide #1 available from Mitsui Mining and Smelting Co., Ltd.

Stearic acid: Stearic acid available from NOF Corporation

Sulfur: Sulfur powder available from Tsurumi Chemical Industry Co., Ltd.

Vulcanization accelerator: Nocceler CZ available from Ouchi Shinko Chemical Industrial Co., Ltd.

Examples and Comparative Examples

According to the formulations shown in Tables 2 and 3, the chemicals other than the sulfur and vulcanization accelerator were kneaded using a Banbury mixer at 150° C. for 5 minutes. To the kneaded mixture were added the sulfur and vulcanization accelerator, and they were kneaded using an open roll mill at 170° C. for 12 minutes to obtain an unvulcanized rubber composition.

The unvulcanized rubber composition was press-vulcanized at 170° C. for 20 minutes to obtain a vulcanized rubber composition.

The unvulcanized rubber compositions and vulcanized rubber compositions thus prepared were evaluated as follows. Tables 2 and 3 show the results. Comparative Examples 1 and 5 are taken as the standard comparative examples in Tables 2 and 3, respectively.

(Processability)

Each unvulcanized rubber composition was measured for Mooney viscosity at 100° C. in accordance with JIS K 6300. The Mooney viscosities are expressed as a processability index relative to the standard comparative example (=100) using the equation below. A higher index indicates better processability.

(Processability index)=(Mooney viscosity of standard comparative example)/(Mooney viscosity in each formulation)×100

(Fuel Economy)

The tan δ of each vulcanized rubber composition was measured using a viscoelasticity spectrometer VES (Iwamoto Seisakusho Co., Ltd.) at a temperature of 30° C., an initial strain of 10%, and a dynamic strain of 2%. The tan δ values are expressed as a fuel economy index relative to the standard comparative example (=100) using the equation below. A higher index indicates better fuel economy.

(Fuel economy index)=(tan δ of standard comparative example)/(tan δ in each formulation)×100

(Abrasion Resistance)

Using a Lambourn abrasion tester, the abrasion loss of each vulcanized rubber composition was measured at room temperature, an applied load of 1.0 kgf, and a slip ratio of 30%. The abrasion losses are expressed as an abrasion resistance index relative to the standard comparative example (=100) using the equation below. A higher index indicates better abrasion resistance.

(Abrasion resistance index)=(Abrasion loss of standard comparative example)/(Abrasion loss in each formulation)×100

TABLE 2

| | | Comparative Example | Example | Comparative Example | | |
|---|---|---|---|---|---|---|
| | | 1 | 1 | 2 | 3 | 4 |
| Formulation (parts by mass) | Copolymer 1 | 100 | — | — | — | — |
| | Copolymer 2 | — | 100 | — | — | — |

TABLE 2-continued

|  |  | Comparative Example 1 | Example 1 | Comparative Example 2 | Comparative Example 3 | Comparative Example 4 |
|---|---|---|---|---|---|---|
|  | Copolymer 3 | — | — | 100 | — | — |
|  | Copolymer 4 | — | — | — | 100 | — |
|  | Copolymer 5 | — | — | — | — | 100 |
|  | Copolymer 6 | — | — | — | — | — |
|  | Copolymer 7 | — | — | — | — | — |
|  | Silica | 75 | 75 | 75 | 75 | 75 |
|  | Carbon black | 5 | 5 | 5 | 5 | 5 |
|  | Oil | 34 | 34 | 34 | 34 | 34 |
|  | Coupling agent | 6 | 6 | 6 | 6 | 6 |
|  | Wax | 2 | 2 | 2 | 2 | 2 |
|  | Antioxidant | 2 | 2 | 2 | 2 | 2 |
|  | Zinc oxide | 2.5 | 2.5 | 2.5 | 2.5 | 2.5 |
|  | Stearic acid | 2 | 2 | 2 | 2 | 2 |
|  | Sulfur | 1.5 | 1.5 | 1.5 | 1.5 | 1.5 |
|  | Vulcanization accelerator | 4 | 4 | 4 | 4 | 4 |
| Evaluation results | Processability index | 100 | 110 | 104 | 101 | 100 |
|  | Fuel economy index | 100 | 116 | 105 | 105 | 100 |
|  | Abrasion resistance index | 100 | 114 | 108 | 103 | 100 |

TABLE 3

|  |  | Comparative Example 5 | Example 2 |
|---|---|---|---|
| Formulation (parts by mass) | Copolymer 1 | — | — |
|  | Copolymer 2 | — | — |
|  | Copolymer 3 | — | — |
|  | Copolymer 4 | — | — |
|  | Copolymer 5 | — | — |
|  | Copolymer 6 | 100 | — |
|  | Copolymer 7 | — | 100 |
|  | Silica | 75 | 75 |
|  | Carbon black | 5 | 5 |
|  | Oil | 34 | 34 |
|  | Coupling agent | 6 | 6 |
|  | Wax | 2 | 2 |
|  | Antioxidant | 2 | 2 |
|  | Zinc oxide | 2.5 | 2.5 |
|  | Stearic acid | 2 | 2 |
|  | Sulfur | 1.5 | 1.5 |
|  | Vulcanization accelerator | 4 | 4 |
| Evaluation results | Processability index | 100 | 109 |
|  | Fuel economy index | 100 | 116 |
|  | Abrasion resistance index | 100 | 111 |

Tables 2 and 3 demonstrate that the rubber compositions of the examples containing the copolymer 2 or 7 of the present invention achieved a balanced improvement in fuel economy and abrasion resistance while having good processability.

The invention claimed is:

1. A pneumatic tire, formed from a rubber composition, the rubber composition comprising:

a rubber component including a copolymer comprising a structural unit derived from a conjugated diene monomer, a structural unit derived from farnesene, and a structural unit derived from a compound represented by the formula (1) below; and at least one of carbon black or silica,

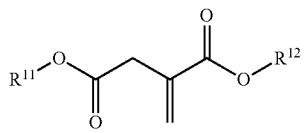
(1)

wherein $R^{11}$ and $R^{12}$ are the same as or different from each other and each represents a hydrogen atom or a C1-C30 hydrocarbon group.

2. The pneumatic tire according to claim 1, wherein the copolymer comprises, per 100% by mass of structural units of the copolymer, 10% to 50% by mass of the structural unit derived from a conjugated diene monomer, 20% to 60% by mass of the structural unit derived from farnesene, and 10% to 30% by mass of the structural unit derived from a compound of formula (1).

3. The pneumatic tire according to claim 1, wherein the copolymer has a weight average molecular weight of 5,000 to 2,000,000 and a molecular weight distribution of 2.1 to 11.

4. The pneumatic tire according to claim 1, wherein $R^{11}$ and $R^{12}$ are ethyl groups.

5. The pneumatic tire according to claim 1, wherein the conjugated diene monomer is 1,3-butadiene.

6. The pneumatic tire according to claim 1, wherein the copolymer further comprises a structural unit derived from a compound represented by the formula (2) below in an amount of 1% to 20% by mass per 100% by mass of structural units of the copolymer,

(2)

wherein $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

* * * * *